UNITED STATES PATENT OFFICE.

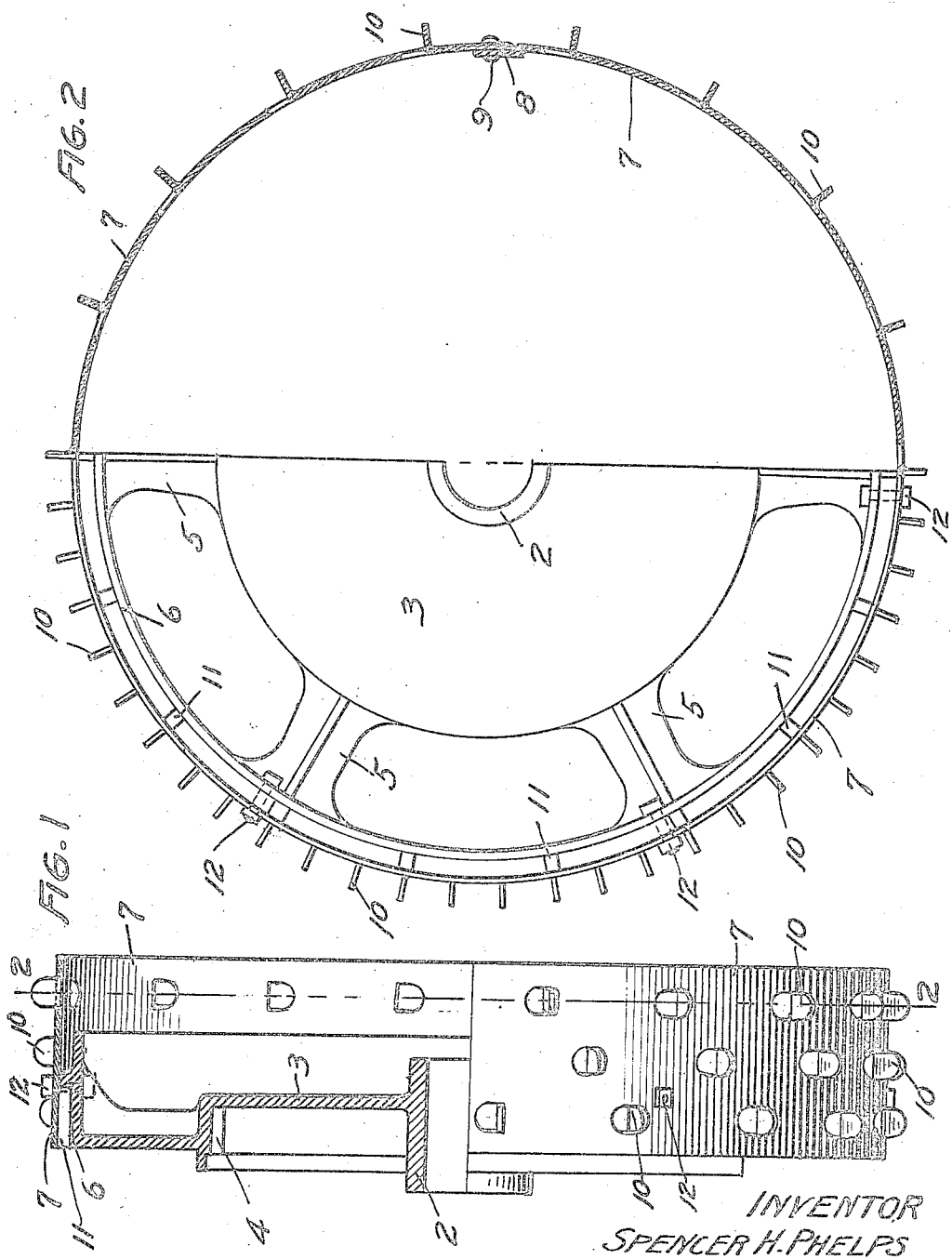

SPENCER H. PHELPS, OF MINNEAPOLIS, MINNESOTA, ASSIGNOR, BY MESNE ASSIGNMENTS, TO BEEMAN TRACTOR COMPANY, OF MINNEAPOLIS, MINNESOTA, A CORPORATION OF MINNESOTA.

WHEEL.

1,425,129.      Specification of Letters Patent.      Patented Aug. 8, 1922.

Application filed August 4, 1919. Serial No. 315,175.

*To all whom it may concern:*

Be it known that I, SPENCER H. PHELPS, a citizen of the United States, resident of Minneapolis, county of Hennepin, State of Minnesota, have invented certain new and useful Improvements in Wheels, of which the following is a specification.

The object of my invention is to provide a wheel adapted particularly for use on a small tractor for lawn mowing purposes, the traction rim being comparatively light and readily removable from the wheel and provided with peripheral lugs or tongues which will insure sufficient traction on the grass without materially damaging the sod.

A further object is to provide a traction rim which will be comparatively inexpensive to manufacture and easily mounted on the wheel.

In the accompanying drawings forming part of this specification,

Figure 1 is a view, partially in section, of a wheel embodying my invention,

Figure 2 is a side view, partially in section, of the same.

In the drawing, 2 represents the hub of a wheel having a flange 3 provided with a gear ring 4 and a series of projecting members 5 supporting a peripheral rim 6 which may be integral with the members 5. 7 represents a supplemental or auxiliary rim, made preferably of sheet metal folded to a circular form and having abutting or lapping ends secured together by suitable means, such as rivets 9. At intervals in this rim I provide lugs 10 pressed or punched out of the metal and preferably in staggered relation and of sufficient length to enter the sod and provide sufficient traction for the wheel without damaging the sod. The rim 6 is provided with external lugs or projections 11 on which the auxiliary rim may be seated and secured to the rim by a suitable number of bolts 12 or other securing means. Whenever desired, this auxiliary rim may be removed and the wheel used in the ordinary manner, and I may provide wheels of different diameter and auxiliary rims of varying diameter and in some instances the lugs in the auxiliary rim may be omitted.

The width of the rim may, of course, be varied according to the character of the soil where the machine is to be used. This metallic band with the lugs pressed outwardly therefrom forms an extremely simple but efficient traction for the wheel and can be readily applied to the rim 6 and conveniently removed when desired.

I do not confine myself to the use of the lugs 11 as these may be omitted and the auxiliary rim 7 secured directly to the parts 5.

I claim as my invention:

1. The combination, with a wheel rim, of an auxiliary rim comprising a metallic band arranged to encircle the wheel rim and seated thereon and of greater width than the wheel rim to increase the width of the normal tread thereof, said auxiliary rim having a series of lugs pressed outwardly therefrom, said lugs being positioned to enter the soil during the revolution of the wheel and increase the traction thereof and said auxiliary rim having means for securing it to the main rim of the wheel.

2. The combination, with a traction wheel rim having a series of projections thereon, of a sheet metal auxiliary rim encircling said wheel rim and seated on said projections and extending outwardly beyond said wheel rim on one side, said auxiliary rim having a series of lugs with rounded outer ends pressed outwardly from the metal composing said auxiliary rim.

3. The combination, with a traction wheel rim, of an auxiliary rim encirclig said wheel rim and composed of a strip of sheet metal having means for securing its abutting ends together, said auxiliary rim extending laterally beyond one edge of said wheel rim to widen the tread thereof and said auxiliary rim having a series of tongues pressed outwardly therefrom, each tongue forming a spade-like tooth for digging into the soil.

In witness whereof, I have hereunto set my hand this 30th day of July, 1919.

SPENCER H. PHELPS.